US010377274B2

(12) United States Patent
Anderson et al.

(10) Patent No.: US 10,377,274 B2
(45) Date of Patent: Aug. 13, 2019

(54) INFANT CARRIER

(71) Applicant: Dorel Juvenile Group, Inc., Foxboro, MA (US)

(72) Inventors: Robert S. Anderson, Narvon, PA (US); David A. Lehman, Lancaster, PA (US); Mei-Hui Lin, Nashville, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 12 days.

(21) Appl. No.: 15/685,430

(22) Filed: Aug. 24, 2017

(65) Prior Publication Data

US 2018/0056824 A1 Mar. 1, 2018

Related U.S. Application Data

(60) Provisional application No. 62/379,513, filed on Aug. 25, 2016.

(51) Int. Cl.
*B60N 2/28* (2006.01)
*B60N 2/42* (2006.01)
*B60N 2/427* (2006.01)

(52) U.S. Cl.
CPC ........ *B60N 2/2845* (2013.01); *B60N 2/2806* (2013.01); *B60N 2/2821* (2013.01); *B60N 2/2863* (2013.01); *B60N 2/2884* (2013.01); *B60N 2/4235* (2013.01); *B60N 2/42709* (2013.01)

(58) Field of Classification Search
CPC .. B60N 2/2806; B60N 2/2821; B60N 2/2845; B60N 2/2863; B60N 2/2884; B60N 2/4235; B60N 2/42709
See application file for complete search history.

(56) References Cited

U.S. PATENT DOCUMENTS

| | | | | |
|---|---|---|---|---|
| 3,596,986 A | * | 8/1971 | Ragsdale | A47D 1/008 297/183.6 |
| 4,743,063 A | * | 5/1988 | Foster, Jr. | A47D 1/004 297/130 |
| 4,750,714 A | * | 6/1988 | Kassai | B60N 2/286 297/219.12 |
| 4,984,845 A | * | 1/1991 | Knoedler | B60N 2/2839 297/256.15 |
| 5,127,120 A | * | 7/1992 | Mason | A47D 15/006 297/219.12 |
| 5,277,472 A | * | 1/1994 | Freese | B60N 2/2821 297/130 |
| 5,333,769 A | * | 8/1994 | Skroski | A47D 5/006 224/148.5 |
| 5,819,341 A | * | 10/1998 | Simantob | A47C 9/002 5/98.1 |
| 5,987,665 A | | 11/1999 | Simantob | |

(Continued)

OTHER PUBLICATIONS

Swandoo, Albert i-Size Baby Car Seat Manual, known to applicant at as of Jul. 17, 2017, no known publication date, 28 pages.

(Continued)

*Primary Examiner* — James M Ference
(74) *Attorney, Agent, or Firm* — Barnes & Thornburg LLP

(57) ABSTRACT

A child restraint includes an infant carrier and a handle coupled to the infant carrier. The handle is mounted for movement relative to the infant carrier.

20 Claims, 9 Drawing Sheets

(56) References Cited

U.S. PATENT DOCUMENTS

| | | | | |
|---|---|---|---|---|
| 6,341,818 B1* | 1/2002 | Verbovszky | A47D 15/006 | 297/219.12 |
| 6,526,607 B2* | 3/2003 | Shillam | A47D 9/00 | 150/100 |
| 6,811,216 B2* | 11/2004 | Sedlack | A47D 13/02 | 297/250.1 |
| 6,991,248 B2 | 1/2006 | Valdez | | |
| 7,270,372 B2* | 9/2007 | Robertson | B60N 2/2821 | 297/183.6 |
| 7,296,820 B2 | 11/2007 | Valdez | | |
| 7,311,357 B2* | 12/2007 | Gold | B60N 2/2812 | 297/219.12 |
| 7,396,039 B2 | 7/2008 | Valdez | | |
| 8,550,489 B2 | 10/2013 | Valdez | | |
| 8,911,015 B2* | 12/2014 | Cohen | B60N 2/2812 | 297/256.16 |
| 8,960,794 B2* | 2/2015 | St. Pierre | A47D 13/02 | 297/219.12 |
| 9,227,648 B2* | 1/2016 | Sundberg | B62B 7/12 | |
| 9,738,182 B2* | 8/2017 | Pos | B60N 2/2821 | |
| 2001/0043001 A1* | 11/2001 | Kassai | B60N 2/2821 | 297/250.1 |
| 2002/0000743 A1* | 1/2002 | Mori | B60N 2/2812 | 297/216.11 |
| 2005/0101202 A1* | 5/2005 | Snell | A47C 15/006 | 441/87 |
| 2006/0076812 A1* | 4/2006 | Ward | B60N 2/2881 | 297/250.1 |
| 2006/0261105 A1* | 11/2006 | Balensiefer | A47D 13/02 | 224/159 |
| 2007/0080568 A1* | 4/2007 | Nakagawa | B60N 2/2809 | 297/253 |
| 2008/0277981 A1* | 11/2008 | Sizemore | B60N 2/2881 | 297/219.12 |
| 2010/0026059 A1* | 2/2010 | Amirault | B60N 2/2851 | 297/216.11 |
| 2010/0026064 A1* | 2/2010 | Marsden | B60N 2/2866 | 297/250.1 |
| 2010/0148543 A1* | 6/2010 | Runk | B60N 2/2872 | 297/216.12 |
| 2010/0225150 A1* | 9/2010 | Duncan | B60N 2/2806 | 297/256.12 |
| 2010/0289307 A1* | 11/2010 | Biaud | B60N 2/2872 | 297/250.1 |
| 2010/0295270 A1* | 11/2010 | Marsden | B60N 2/2872 | 280/728.2 |
| 2010/0295341 A1* | 11/2010 | Marsden | B60N 2/2851 | 297/216.11 |
| 2010/0295342 A1* | 11/2010 | Marsden | B60N 2/2851 | 297/216.11 |
| 2010/0295343 A1* | 11/2010 | Marsden | B60N 2/2866 | 297/216.11 |
| 2010/0295344 A1* | 11/2010 | Marsden | B60N 2/2884 | 297/216.11 |
| 2010/0295345 A1* | 11/2010 | Marsden | B60N 2/2851 | 297/216.11 |
| 2010/0295346 A1* | 11/2010 | Marsden | B60N 2/2851 | 297/216.11 |
| 2010/0295347 A1* | 11/2010 | Marsden | B60N 2/2851 | 297/216.11 |
| 2011/0062752 A1* | 3/2011 | Kho | A47D 1/10 | 297/130 |
| 2011/0285187 A1* | 11/2011 | Horton | B60N 2/2812 | 297/250.1 |
| 2011/0298257 A1* | 12/2011 | Abadilla | B60N 2/062 | 297/256.12 |
| 2012/0306243 A1* | 12/2012 | Oltman | B60N 2/2884 | 297/216.11 |
| 2013/0009428 A1* | 1/2013 | Heisey | A47D 13/02 | 297/183.2 |
| 2015/0091344 A1* | 4/2015 | Tanner | B60N 2/4249 | 297/216.11 |
| 2015/0251567 A1* | 9/2015 | Cohen | B60N 2/2806 | 297/256.15 |
| 2015/0329015 A1* | 11/2015 | Forbes | B60N 2/265 | 297/183.6 |
| 2015/0375641 A1* | 12/2015 | van Mourik | B60N 2/2881 | 297/250.1 |
| 2016/0059748 A1* | 3/2016 | Cohen | B60N 2/2884 | 297/183.7 |
| 2018/0056822 A1* | 3/2018 | Anderson | B60N 2/2806 | |
| 2018/0056823 A1* | 3/2018 | Anderson | B60N 2/2806 | |
| 2018/0056824 A1* | 3/2018 | Anderson | B60N 2/2821 | |

OTHER PUBLICATIONS

Cybex, Cloud Q Instruction Manual, known to applicant at least as of Jul. 17, 2017, no known publication date, 190 pages.

International Search Report and Written Opinion, International Application No. PCT/US2017/048387, dated Nov. 20, 2017, 11 pages.

* cited by examiner

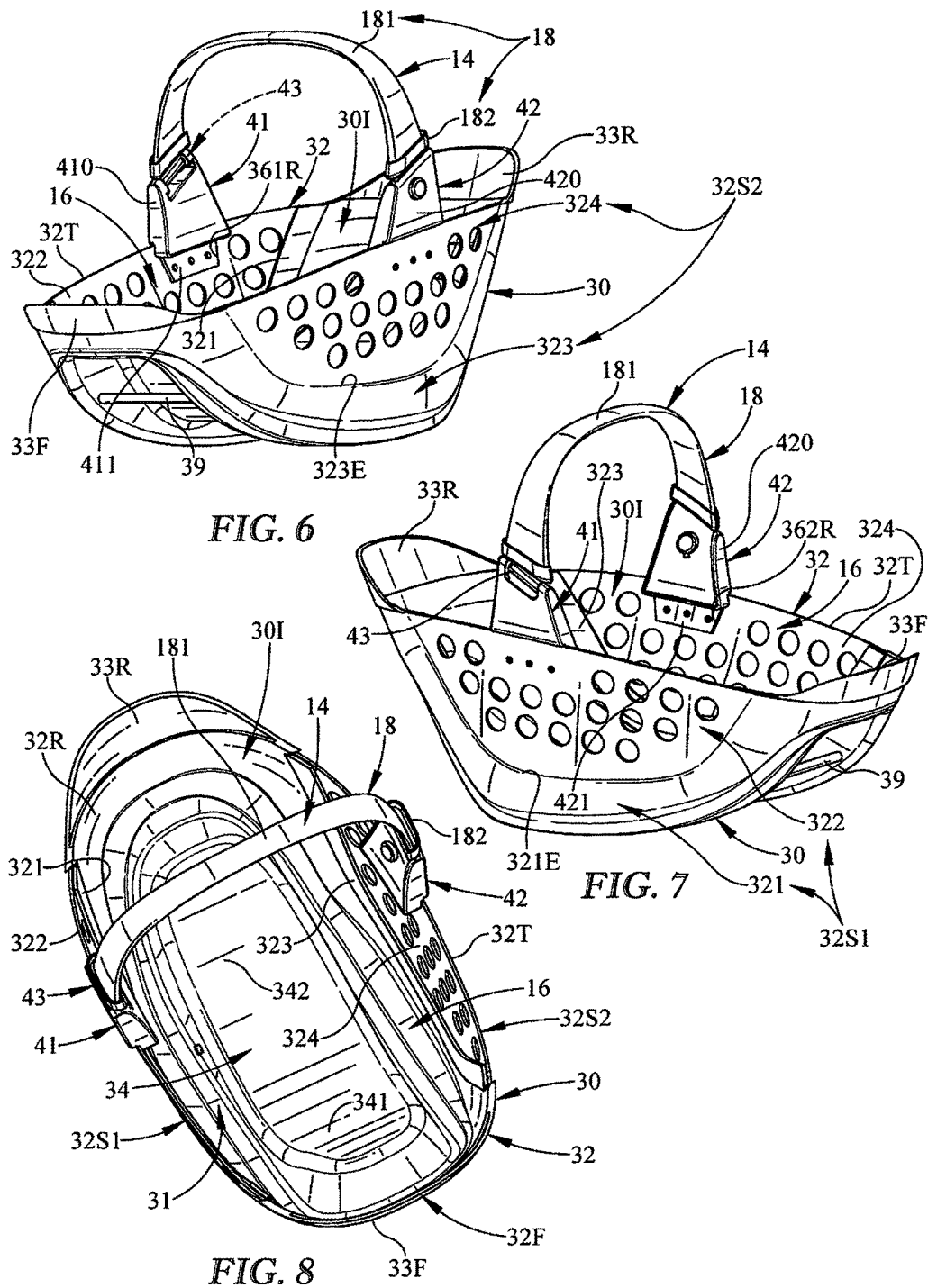

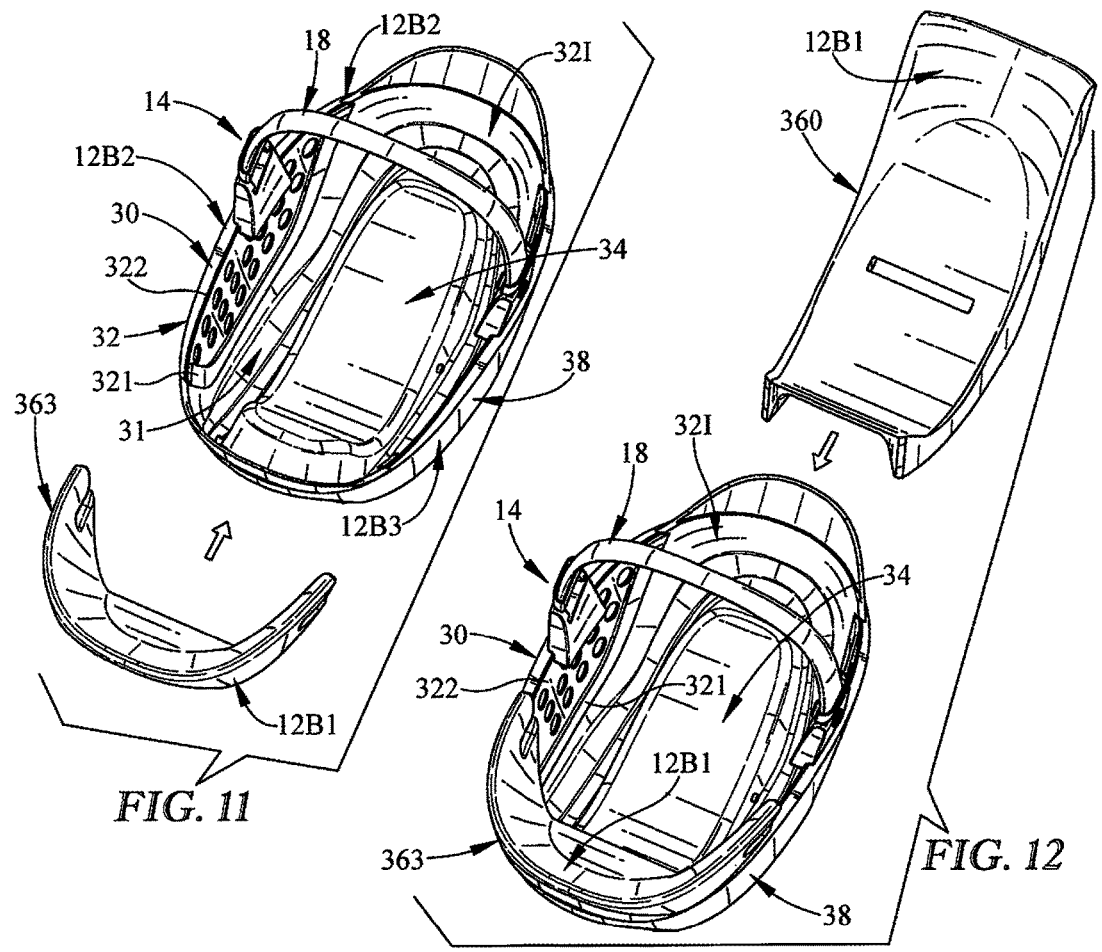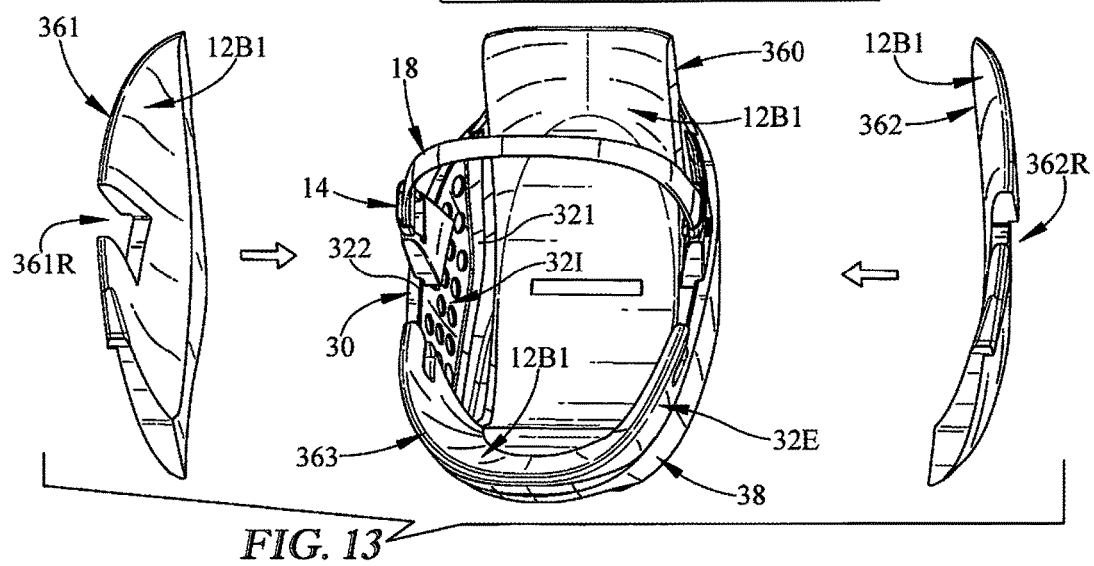

INFANT CARRIER

PRIORITY CLAIM

This application claims priority under 35 U.S.C. § 119(e) to U.S. Provisional Application No. 62/379,513, filed Aug. 25, 2016, which is expressly incorporated by reference herein.

BACKGROUND

The present disclosure relates to child restraints, and particularly to a child restraint that is adapted to be used in a vehicle. More particularly, the present disclosure relates to an infant carrier that can be mounted on a base that is adapted to set on a passenger seat in a vehicle and that can be separated from the base and used by a caregiver to carry the infant away from the vehicle.

SUMMARY

A child restraint in accordance with the present disclosure includes an infant carrier. In illustrative embodiments, the infant carrier can be mounted on a stationary carrier-support base that is anchored to a passenger seat in a vehicle to restrain an infant during transport in the vehicle. The infant carrier also can be separated from the base to allow a caregiver to carry the infant away from the vehicle using a handle included in the infant carrier.

In illustrative embodiments, the infant carrier includes a seat bucket sized to receive an infant and a carry handle coupled to the seat bucket. The seat bucket is configured to mate with the carrier-support base so that the infant carrier can be used in a vehicle. After the seat bucket is separated from the carrier-support base and removed from the vehicle, a caregiver can use the carry handle to move the seat bucket and transport an infant in the seat bucket away from the vehicle.

In illustrative embodiments, the seat bucket includes a carrier shell made of a plastics material and coupled to the carry handle. A cummerbund made of softgoods material is wrapped around an exterior surface of the carrier shell. An infant-support nest made of softgoods material is placed in an interior region of the carrier shell. The nest comprises a body-support pad having a seat bottom and a seat back, a first side pad rising up from a first side of the body-support pad, a second side pad rising up from an opposite second side of the body-support pad, and front pad arranged to extend between front ends of the first and second side pads and lie in spaced-apart relation to the seat back of the body-support pad.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed disclosure particularly refers to the accompanying figures in which:

FIG. 6 is a perspective view of the carrier shell of FIG. 5 after the carry handle has been assembled and coupled to perforated panels included in opposing first and second side portions of the side wall of the carrier shell;

FIG. 7 is another perspective view of the carry handle and the carrier shell;

FIG. 8 is a top perspective view of the handle and shell of FIGS. 6 and 7 showing that the carrier shell is formed to include an upwardly opening interior region sized to receive therein the four components comprising the infant-support nest shown in FIG. 5;

FIG. 11 is a perspective view showing the lap-belt guide of the infant-support nest before it is mounted in the interior region of the carrier shell to assume the stationary position shown in FIG. 12 and showing that the cummerbund has been mounted on the exterior surface of the carrier shell and that the rest of the carry handle has been assembled;

FIG. 12 is a view similar to FIG. 11 before the body-support pad of the infant-support nest is mounted in the interior region of the carrier shell to assume the stationary position shown in FIG. 13;

FIG. 13 is a perspective view similar to FIG. 12 before the first and second side pads of the infant-support nest are mounted in the interior region of the carrier shell to assume the stationary positions shown in FIGS. 14-18;

DETAILED DESCRIPTION

Figure 1:
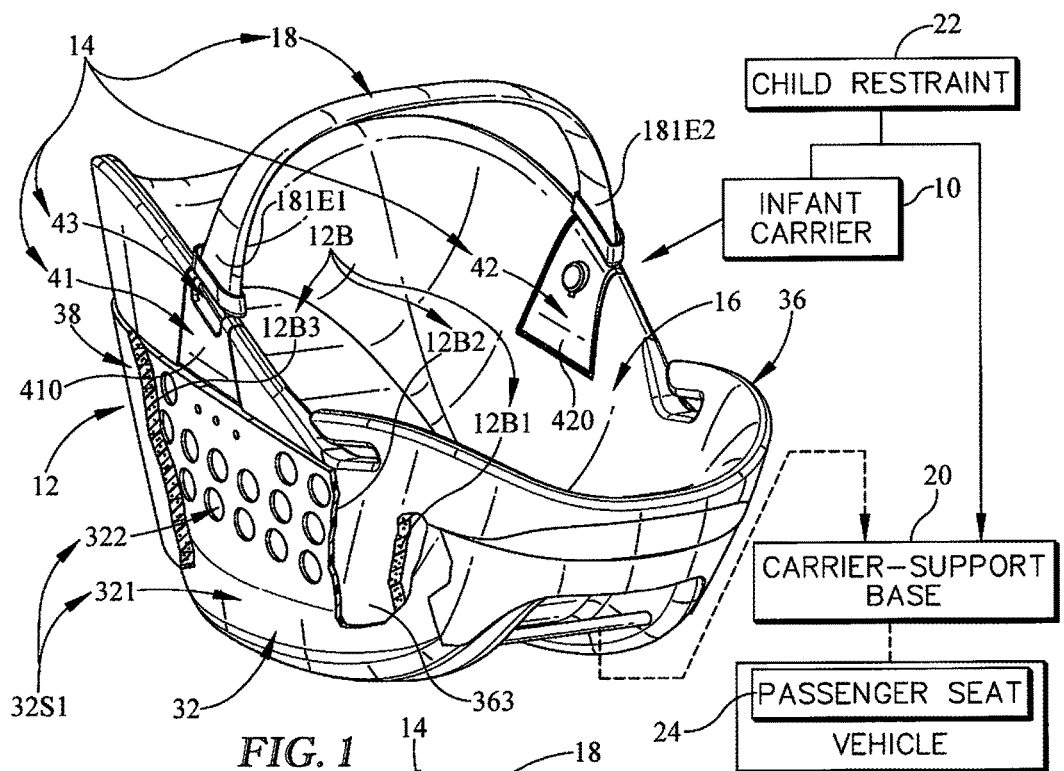
FIG. 1 is a perspective view of an infant carrier in accordance with the present disclosure, with portions broken away to show three layers included in a side wall of the seat bucket, showing that the infant carrier includes a seat bucket, and a carry handle coupled to the seat bucket and showing that the seat bucket comprises a carrier shell made of a plastics material and coupled to the carry handle, a cummerbund made of softgoods material and arranged to wrap around an exterior surface of the carrier shell, and an infant-support nest made of softgoods material, arranged to lie in an interior region of the carrier shell under the carry handle, and formed to extend upwardly above a top edge of the carrier shell and to include, in an illustrative embodiment, two lap-belt receiver slots located near the legs and feet of an infant occupying the seat bucket.
Figure 2:
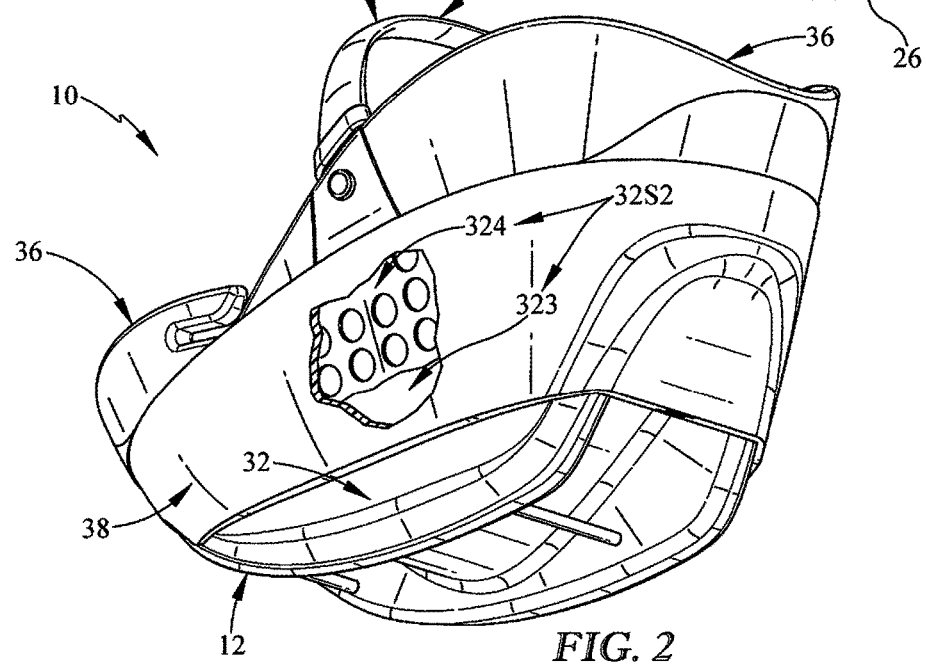
FIG. 2 is another perspective view showing the underside of the infant carrier of FIG. 1 with a portion of the cummerbund broken away to show that the side wall of the carrier shell includes a perforated panel and a solid panel.

An infant carrier 10 in accordance with the present disclosure includes a seat bucket 12 and a carry handle 14 as suggested in FIG. 1. Seat bucket 12 is formed to include an infant-receiving space 16 sized to receive an infant (not shown) during use of infant carrier 10.

Infant carrier 10 can be mounted on an underlying stationary carrier-support base 20 as suggested diagrammatically in FIG. 1 to form a child restraint 22 for use in a vehicle 26. Carrier-support base 20 can be anchored by a caregiver using any suitable means to a passenger seat 24 in a vehicle 26 as suggested diagrammatically in FIG. 1 and illustratively in FIGS. 3 and 4. Child restraint 22 can be used to restrain an infant (not shown) that is placed in the infant-receiving space 16 of seat bucket 12 during transport in vehicle 26. It is within the scope of the present disclosure to configure child restraint 22 so that a caregiver can separate infant carrier 10 from its companion carrier-support base 20 to free the caregiver to transport the infant in seat bucket 12 away from vehicle 26 using the carry handle 14.

Seat bucket 12 includes a multi-layer side barrier 12B that is arranged to surround and border the infant-receiving space 16 formed in seat bucket 12 as suggested in FIG. 1. In illustrative embodiments, multi-layer side barrier 12B includes an inner layer 12B1 configured to form the outer boundary of infant-receiving space 16, an outer layer 12B3 arranged to surround inner layer 12B1 to define a space therebetween, and a middle layer 12B2 arranged to lie in that space and mate with each of inner and outer layers 12B3 as suggested in FIGS. 1, 18, and 18A. Inner and outer layers 12B1, 12B3 are made of relatively soft shock-absorbing cushioning materials having a lower durometer while middle layer 12B2 is made of a relatively harder yet deformable material having a relatively higher durometer as compared to inner and outer layers 12B1, 12B3. Durometer is a measure of the hardness of a material and the resistance of a material to permanent indentation when exposed to an external force.

In an illustrative embodiment, seat bucket 12 includes a carrier shell 30, an infant-support nest 36 configured to provide interior padding for carrier shell 30, and a cummerbund 38 configured to provide exterior padding for carrier shell 30 as suggested in FIGS. 1-5. Portions of carrier shell 30, infant-support nest 36, and cummerbund 38 cooperate to form multi-layer side barrier 12B as suggested in FIGS. 1,18, and 18A. Relatively harder portions of carrier shell 30 are sandwiched between relatively softer portions of infant-support nest 30 and cummerbund 38.

Carrier shell 30 is configured to be mounted temporarily with the underlying carrier-support base 20 in any suitable manner to assume a stationary mounted position on carrier-support base 20 when seat bucket 12 is used to transport an infant in vehicle 26. In illustrative embodiments, shell-mount rods 39 are coupled to the underside of carrier shell 30 as suggested in FIGS. 5, 10, 14, 15, and 19 and arranged to mate with a rod retainer 39R included in carrier-support base 20 as suggested in FIGS. 3 and 4 to retain carrier shell 30 and seat bucket 12 in a (temporary) stationary position on carrier-support base 20. Carrier shell 30 is also configured to be separated from the underlying carrier-support base 20 under the control of a caregiver in any suitable manner when the caregiver wishes to use carry handle 14 to transport an infant in seat bucket 12 away from vehicle 26.

Figure 3:
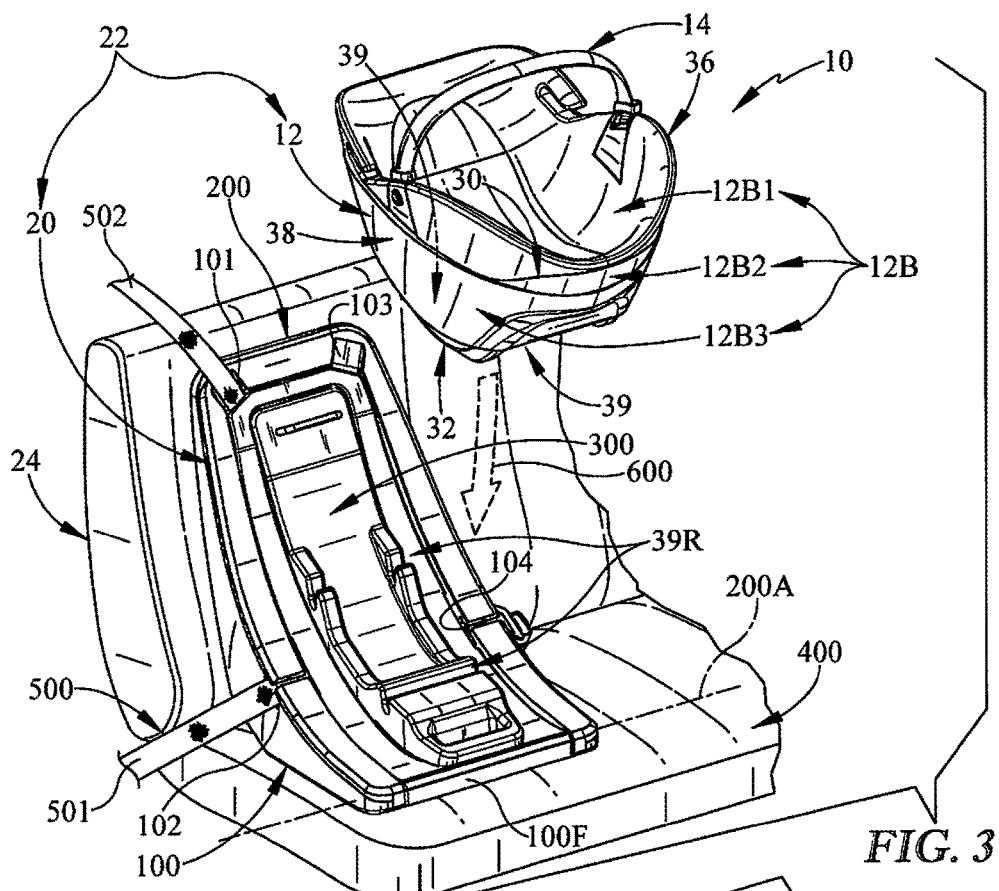
FIG. 3 is a perspective view of the infant carrier of FIGS. 1 and 2 along with a carrier-support base retained in a stationary position on a vehicle passenger seat using lap and shoulder belts associated with the vehicle passenger seat before the infant carrier is moved downwardly as suggested by the phantom arrow to be mounted on the underlying carrier-support base as suggested in FIG. 4.
Figure 4:
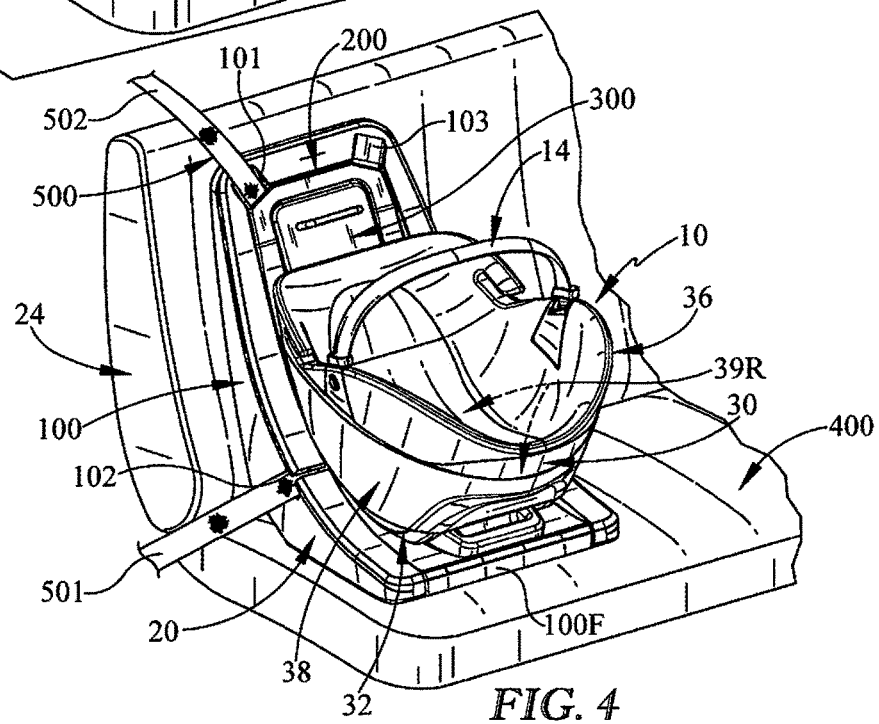
FIG. 4 is a view similar to FIG. 3 after the infant carrier has been mounted on the underlying carrier-support base.

As suggested in FIG. 3, carrier-support base 20 includes an L-shaped foundation 100 formed to include four strap-receiver channels 101-104, a pivotable belt clamp 200 mounted on a forward bottom end 100F of L-shaped foundation 100 for pivotable movement about a pivot axis 200A, and a curved carrier mount 300 mounted on pivotable belt clamp 200 to pivot therewith and formed to include rod retainer 39. L-shaped foundation 100 is adapted to be restrained in a stationary position on a vehicle passenger seat 400 using lap and shoulder straps 501, 502 included in a vehicle seat belt 500 as suggested in FIG. 3. Portions of the lap and shoulder straps 501, 502 of vehicle seat belt 500 are trapped between L-shaped foundation 100 and pivotable belt clamp 200 when belt clamp 200 is pivoted about pivot axis 200A to the closed position shown in FIG. 3. When belt clamp 200 is locked in the closed position, the rod retainer 39R included in curved carrier mount 300 is oriented to face upwardly to be mated with the retainer rods 39 coupled to the underside of carrier shell 30 of seat bucket 12 as suggested in FIG. 3. Then a caregiver may move infant carrier 10 downwardly in direction 600 as suggested in FIG. 3 to cause retainer rods 39 to mate with rod retainer 39R to anchor infant carrier 10 in a stationary position on carrier-support base 20 as shown, for example, in FIG. 4.

Carry handle 14 includes a first (strap) mount 41 coupled to one side portion 32S1 of carrier shell 30 of seat bucket 12, a second (strap) mount 42 coupled to an opposite side portion 32S2 of carrier shell 30 of seat bucket 12, a hinge 43 coupled to first strap mount 41, and a seat-bucket lifter 18 as suggested in FIGS. 1-5. A first end of seat-bucket lifter 18 is always coupled to hinge 43 in illustrative embodiments as suggested in FIGS. 1-4. An opposite second end of seat-bucket lifter 18 is configured normally to be coupled by a caregiver to second strap mount 42 as also suggested in FIGS. 1-4. Although seat-bucket lifter 18 is configured to be pivoted laterally on hinge 43 between opened and closed positions in certain illustrative embodiments, it is within the scope of the present disclosure alternatively to configure seat-bucket lifter 18 to be pivoted in forward and rearward directions about a laterally extending pivot axis extending through first and second strap mounts 41, 42.

Figure 5:
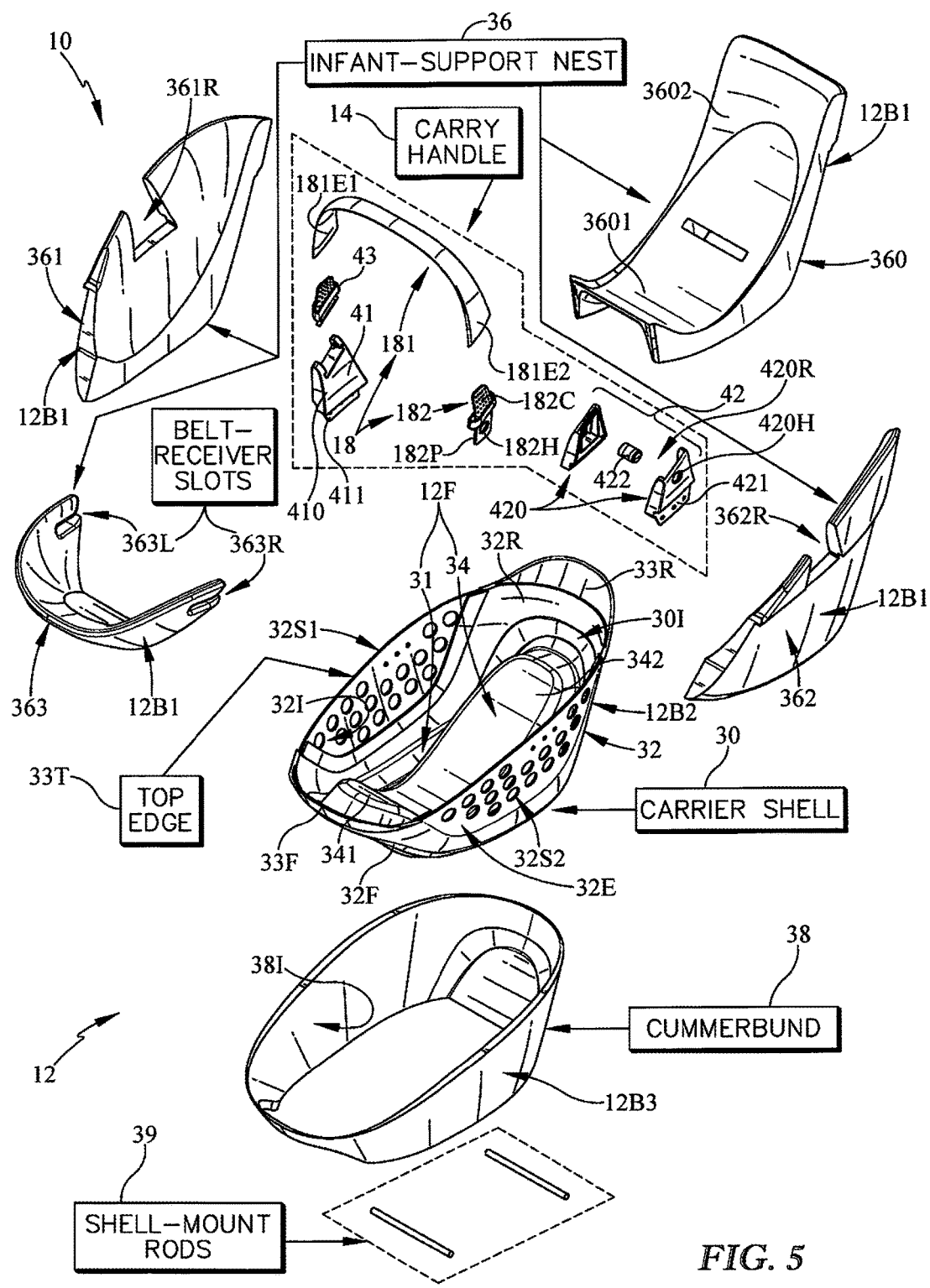
FIG. 5 is an exploded perspective assembly view of components comprising the infant carrier of FIGS. 1-4 showing that the infant carrier comprises a carrier shell including two perforated (side) panels, a cummerbund, an infant-support nest comprising a first side pad formed to include a first strap-mount cutout, a body-support pad having a seat bottom and a seat back extending upwardly away from the seat bottom, a second side pad formed to include a second strap-mount cutout, and a front pad formed to include spaced-apart first and second belt-receiver slots and showing that the carry handle includes a carry strap made of softgoods material, a first strap mount adapted to mate with a first side portion of a side wall of the underlying carrier shell and associated with the first side pad, a hinge adapted to link the first strap mount to a first end of the carry strap, a multi-part second strap mount adapted to mate with a second side portion of a side wall of the underlying carrier shell and associated with the second side pad, and a buckle adapted to be coupled to a second end of the carry strap and to be mated by a caregiver to the second strap mount, and showing two shell-mount rods that can be mounted on the underside of the carrier shell to mate with companion rod retainers in a carrier-support base as suggested in FIG. 3.

Carrier shell 30 includes a bottom wall 31, an endless side wall 32 extending upwardly from the bottom wall 31 and terminating at a top edge 32T, and upstanding front and rear collars 33F, 33R coupled to endless side wall 32 as suggested in FIG. 5. Carrier shell 30 also includes an infant seat 34 coupled to the bottom wall 31 and forward and rearward portions 32F, 32R of side wall 32 and arranged to extend upwardly in an interior region 30I bounded by carrier shell 30 as also suggested in FIG. 5. Endless side wall 32 surrounds infant seat 34 and defines middle layer 12B2 of multi-layer side barrier 12B of seat bucket 12 as suggested in FIGS. 1, 18, and 18A. Carrier shell 30 is a monolithic component made of a plastics material in illustrative embodiments.

Side wall 32 of carrier shell 30 is somewhat elliptical when viewed from above as suggested in FIG. 5. Side wall 32 comprises forward portion 32F, rearward portion 32R, and first and second side portions 32S1, 32S2 arranged to lie in spaced-apart relation to one another to locate infant seat 34 therebetween as suggested in FIGS. 5-8. In illustrative embodiments, first side portion 32S1 includes a broad, low-profile, U-shaped solid panel 321 and a perforated panel 322 coupled to an upwardly facing U-shaped edge 321E of U-shaped solid panel 321 as suggested in FIG. 7. Second side portion 32S2 includes a broad, low-profile, U-shaped solid panel 323 and a perforated panel 324 coupled to an upwardly facing U-shaped edge 323E of U-shaped solid panel 323 as suggested in FIG. 6.

Portions of endless side wall 32 of carrier shell 30 are configured to flex during exposure of carrier shell 30 to external impacts. Such portions can be characterized as deformable and, in some cases, elastic in accordance with the present disclosure. In illustrative embodiments, endless side wall 32 of carrier shell 30 is characterized by a durometer that is relatively higher than the durometer of infant-support nest 36 and cummerbund 38.

Infant seat 34 includes a seat bottom 341 and a seat back 342 arranged to extend upwardly away from seat bottom 341 as suggested in FIG. 5. Seat bottom 341 is arranged to extend upwardly along forward portion 32F of endless side wall 32 and terminate in spaced-apart relation to top edge 32T and front collar 33F as suggested in FIG. 5. Seat back 342 is arranged to extend along bottom wall 31 and upwardly along rearward portion 32R of side wall 32 and terminate in spaced-apart relation to top edge 32T and rear collar 33R as suggested in FIG. 5. Infant seat 34 is centered midway between first and second side portions 32S1, 32S2 of side wall 32 as suggested in FIG. 8.

Infant-support nest 36 is configured to provide interior padding for bottom wall 31, endless side wall 32, front and rear collars 33F, 33R, and infant seat 34 of carrier shell 30 as suggested in FIGS. 1-5. In illustrative embodiments, infant-support nest 36 comprises body-support pad 360, first and second side pads 361, 362, and front pad 363 as shown, for example, in FIG. 5. Each of pads 360-363 is made of a suitable deformable material that is elastic in illustrative embodiments.

Body-support pad 360 of infant-support nest 36 comprises a seat bottom 3601 and a seat back 3602 arranged to extend upwardly from seat bottom 3601 as suggested in FIG. 5. When infant-support nest 36 is placed in interior region 30I of carrier shell 30 as suggested in FIGS. 5 and 14-16, seat bottom 3601 of body-support pad 360 is aligned with and arranged to cover the seat bottom 341 of the underlying infant seat 34 of carrier shell 30 and seat back 3602 of body-support pad 360 is aligned with and arranged to cover the seat back 342 of the underlying infant seat 34 of carrier shell 30.

First side pad 361 of infant-support nest 36 is formed to include an upwardly opening strap-mount receiver 361R for receiving portions of first strap mount 41 therein when first strap mount 41 is coupled to perforated panel 322 of first side portion 32S1 as suggested in FIGS. 5-8 and 16. First side pad 361 of infant-support nest 36 is sized, shaped, and arranged to cover solid and perforated panels 321, 322 of first side portion 32S1 of side wall 32 when placed in interior region 30I of carrier shell 30.

Second side pad 362 of infant-support nest 36 is formed to include an upwardly opening strap-mount receiver 362R for receiving portions of second strap mount 42 therein when second strap mount 42 is coupled to perforated panel 324 of second side portion 32S2 as suggested in FIGS. 5-8 and 17. Second side pad 362 of infant-support nest 36 is sized, shaped, and arranged to cover solid and perforated panels 323, 324 of second side portion 32S2 of side wall 32 when placed in interior region 30I of carrier shell 30.

Front pad 363 of infant-support nest 36 is formed to include two rearwardly opening belt-receiving guide slots 363L, 363R in an illustrative embodiment as suggested in FIG. 5. Front pad 363 of infant-support nest 36 is sized, shaped, and arranged to cover the front portion 32F and forward sections of first and second side portions 32S1, 32S2 of side wall 32 of carrier shell 30 as suggested in FIG. 18. Each of guide slots 363L, 363R is configured to receive a portion of a lap belt (not shown) included in a seat belt system included in vehicle 26.

Multi-layer barrier 12B of seat bucket 12 is configured to provide flexible side panels that enhance the opportunity for a caregiver to carry infant carrier 10 in a more ergonomic position alongside the body of the caregiver. At the same time infant carrier 10 is configured to be mounted on a carrier-smart base 20 as suggested in FIGS. 3 and 4 or alternatively on a stroller frame (not shown) provided with rod retainer 39R. Because of the semi-rigid nature of infant carrier 10 it is easy to install on a base for a vehicle or frame for a stroller. Because of various handles, straps, and/or soft flexible sides, infant carrier 10 is easy to carry.

Inner layer 12B1 of multi-layer barrier 12B of seat bucket 12 is defined by first side pad 361, front pad 363, second side pad 362, and seat back 3602 of body-support pad 360 as suggested in FIGS. 1, 5, and 11-13. Body-support pad 360 is made of a relatively low durometer softgoods material in an illustrative embodiment.

Outer layer 12B3 of multi-layer barrier 12B of seat bucket 12 is defined by cummerbund 38 as suggested in FIGS. 1, 5, and 11-13. Cummerbund 38 is made of a relatively lower durometer softgoods material in an illustrative embodiment.

Middle layer 12B3 of multi-layer barrier 12B of seat bucket 12 is defined by side wall 32 of carrier shell 30 as suggested in FIGS. 1, 5, and 11-13. Side wall 32 is made of a relatively higher durometer plastics material in an illustrative embodiment.

Illustrative components included in carry handle 14 are shown in FIG. 5. Carry handle 14 includes a first (strap) mount 41, a second (strap) mount 42, a hinge 43, a carry strap 181, and a buckle 182 as shown, for example, in FIG. 5.

First strap mount 41 includes a base 410, an anchor flange 411, and a hinge support 412 as shown in FIG. 3. Base 410 is sized to fit in the upwardly opening strap-mount receiver 361R formed in first side pad 361 of infant-support nest 36 as suggested in FIGS. 5 and 18. Anchor flange 411 is coupled to a lower portion of base 410 as suggested in FIG. 5 and is configured to mate with perforated panel 322 of first side portion 32S1 of side wall 32 of carrier shell 30 to support base 410 in a stationary position on carrier shell 30 as suggested in FIG. 6. Hinge support 412 is coupled to an upper portion of base 410 as suggested in FIG. 5 and is configured to mate with hinge 43 as suggested in FIGS. 5 and 6.

Carry strap 181 is made of a pliable material in illustrative embodiments in accordance with the present disclosure that is characterized by enough stiffness so that it generally maintains its shape during movement relative to seat bucket 12 yet could deform in response to a sufficient external impact. Carry strap 181 has a first end 181E1 coupled to hinge 43 and an opposite second end 181E2 coupled to buckle 182 as suggested in FIGS. 1-5.

Buckle 182 includes a downwardly extending plate 182P adapted to mate with second strap mount 42 as suggested in FIGS. 1 and 5 to tether the second end 181E2 of carry strap 181 to second strap mount 42 when carry strap 181 is in a closed infant-carrying position shown in FIG. 1. Buckle 182 also includes an upwardly extending strap connector 182C coupled to each of plate 182P and the second end 181E2 of carry strap 181 as suggested in FIGS. 1 and 5.

Second strap mount 42 includes a two-part base 420, an anchor flange 421, and a movable buckle-plate retainer 422 as shown in FIG. 3. Base 420 is sized to fit in an upwardly opening strap-mount receiver 362R formed in second side pad 362 of infant-support nest 36 as suggested in FIGS. 5 and 18. Anchor flange 421 is coupled to a lower portion of base 420 as suggested in FIG. 5 and is configured to mate with perforated panel 324 of second side portion 32S2 of side wall 32 of carrier shell 30 to support base 420 in a stationary position on carrier shell 30 as suggested in FIG. 7. Base 420 is formed to include an upwardly opening buckle-plate receiver 420R sized to receive plate 182P of buckle 182 therein as suggested in FIGS. 1 and 5. Buckle-plate retainer 422 is spring-loaded using any suitable spring means to extend through buckle-plate receiver 420R and a hole 182H formed in plate 182P and a hole 420H formed in base 420 as suggested in FIGS. 1 and 5 to retain plate 182P in buckle-plate receiver 420R of base 420 when carry strap 181 is moved to its closed infant-carrying position as suggested in FIGS. 1 and 5.

Carry strap 181 is flexible and soft in illustrative embodiments to allow the caregiver carrying infant carrier 10 to have their arm close to their body aiding leverage to carry infant carrier 10 away from vehicle 26. The soft carry strap 181 naturally creates a broad evenly distributed point of contact with the caregiver's arm minimizing uncomfortable pressure spots. In illustrative embodiments, carry strap 181 is made of one or more of foam, rubber, or thin fabric or plastics material layered together to form a tough but flexible carry strap 181. In alternative embodiments, such a carry strap could be coupled permanently to opposite sides of seat bucket 12.

Child restraint 22 includes an infant carrier 10 including a seat bucket 12 sized to receive an infant and a carry handle 14 as shown, for example, in FIGS. 1-4. Seat bucket 12 includes a carrier shell 30 formed to include an interior region 30I, an infant-support nest 36 placed in interior region 30I of carrier shell 30 to support an infant transported in carrier shell 30 and provide interior padding for carrier shell 30, and a cummerbund 38 mounted on an exterior surface of carrier shell 30 to provide exterior padding for carrier shell 30 as suggested in FIG. 5. Carry handle 14 is coupled to carrier shell 30 as suggested in FIGS. 6-8.

Figure 18:
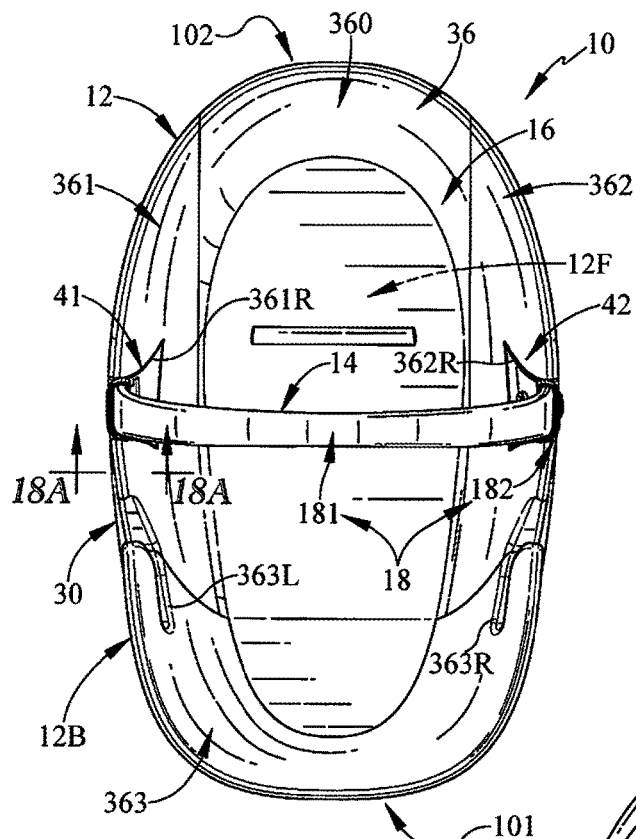
FIG. 18 is a top plan view of the infant carrier of FIG. 1.
Figure 18A:
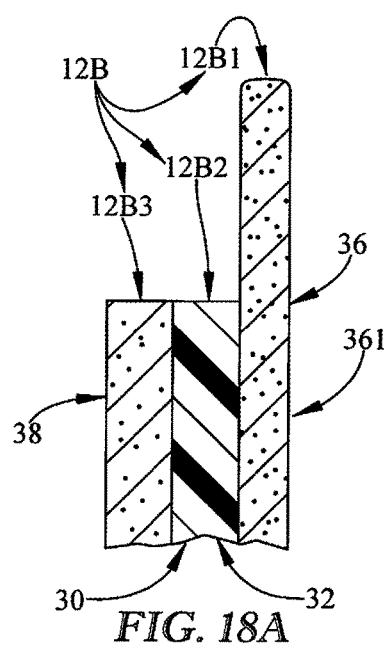
FIG. 18A is an enlarged partial sectional view of the seat bucket taken along line 18A-18A showing that a multi-layer side barrier of the seat bucket comprises (left to right) a soft outer layer, a relatively harder middle layer, and a relatively soft inner layer.
Figure 19:
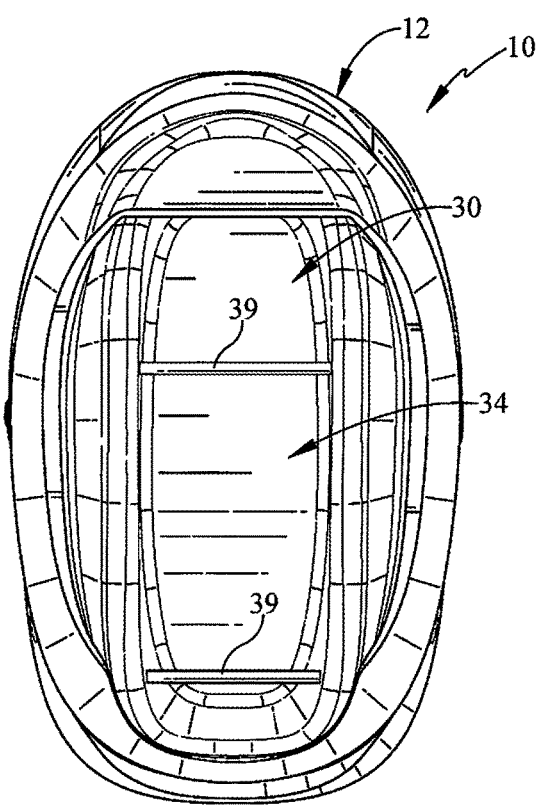
FIG. 19 is a bottom view of the infant carrier of FIG. 1.

Portions of carrier shell 30, infant-support nest 36, and cummerbund 30 cooperate to form a multi-layer side barrier 12B around an infant supported in infant-support nest 36 in interior region 30I of carrier shell 30 as suggested in FIGS. 18 and 18A. The multi-layer side barrier 12B includes an inner layer 12B1 provided by infant-support nest 36 and made of a first relatively soft shock-absorbing cushioning material, an outer layer 12B3 provided by cummerbund 38 and made of a second relatively soft shock-absorbing cushioning material, and a middle layer 12B2 made of a relatively harder yet deformable material having a relatively higher durometer as compared to the inner and outer layers 12B1, 12B3.

Carry handle 14 is coupled to middle layer 12B2 as suggested in FIG. 11. Carry handle 14 is arranged to extend laterally over an infant-receiving space 16 formed in infant-support nest 36 as shown, for example, in FIG. 8.

Carry handle 14 includes a first mount 41 coupled to a first side portion 32S1 as suggested in FIG. 7 of carrier shell 30 and arranged to extend upwardly away from a top edge 32T of first side portion 32S1 as suggested in FIG. 7 and a second mount 42 coupled to an opposite second side portion 32S2 of carrier shell 30 and arranged to extend upwardly away from a top edge 32T of second side portion 32S2 and lie in laterally spaced-apart relation to first mount 41 to locate a portion of the infant-receiving space 16 therebetween as suggested in FIG. 6. Carry handle 14 also includes a seat-bucket lifter 18 coupled to first mount 41 and adapted to be coupled to second mount 42 when the carry handle 14 occupies a closed infant-carrying position as shown in FIG. 1.

Infant-support nest 36 includes a first side pad 361 that is mated with the first side portion 32S1 of carrier shell 30 and is formed to include an upwardly opening first mount receiver 361R configured to receive portions of first mount 41 therein as suggested in FIGS. 5, 13, and 18. Infant-support nest 36 also includes a second side pad 362 that is mated with the second side portion 32S2 of carrier shell 30 and is formed to include an upwardly opening second mount receiver 362R configured to receive portions of second mount 42 therein as suggested in FIGS. 5, 13, and 18.

Infant-support nest 36 further includes a front pad 363 arranged to mate with a foot end of carrier shell 30 and mate with forward ends of first and second side pads 361, 362 as suggested in FIGS. 5, 11 and 18 and a body-support pad 360 arranged to mate with a head end of carrier shell 30 and extend between and mate with first and second side pads 361, 362 as suggested in FIGS. 5, 12, 13, and 18. Body-support pad 360 includes a seat bottom 3601 and a seat back 3602 arranged to extend upwardly from the seat bottom 3601 toward head end of carrier shell 30 as shown, for example, in FIG. 5.

Figure 9:
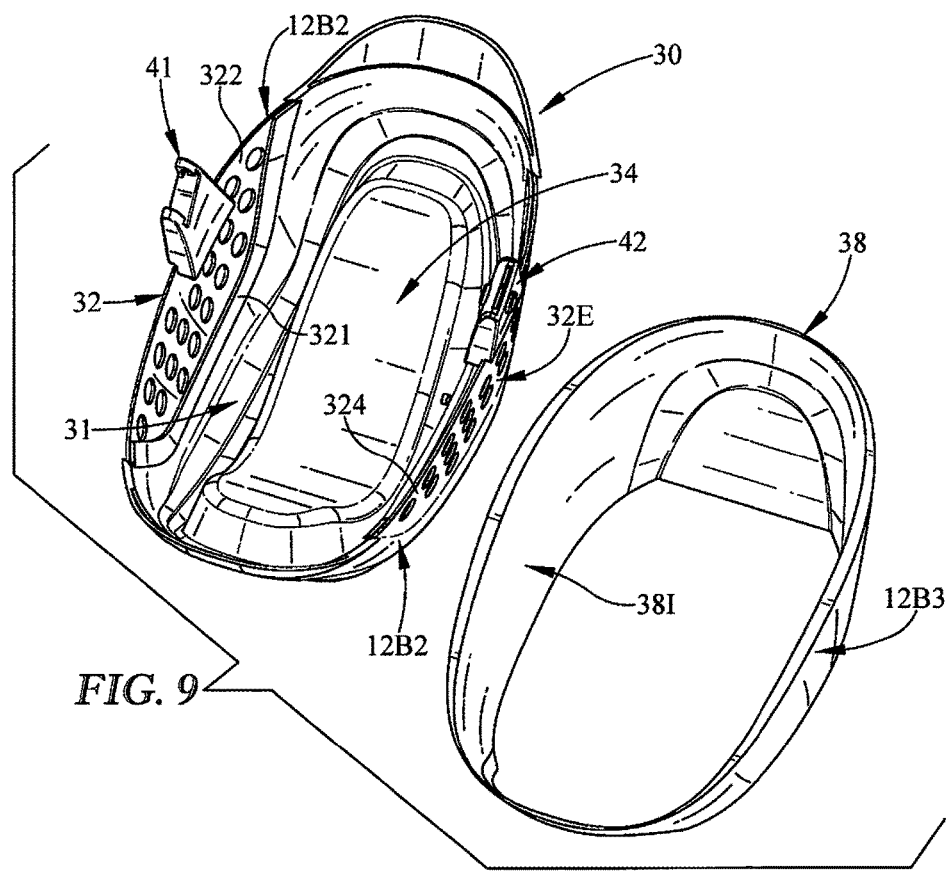
FIG. 9 is a perspective view of the carrier shell before the cummerbund is mounted on an exterior surface of the carrier shell and showing that the first strap mount is coupled to the perforated panel included in the first side portion of the side wall of the carrier shell and that the second strap mount is coupled to the perforated panel included in the second side portion of the side wall of the carrier shell.
Figure 10:
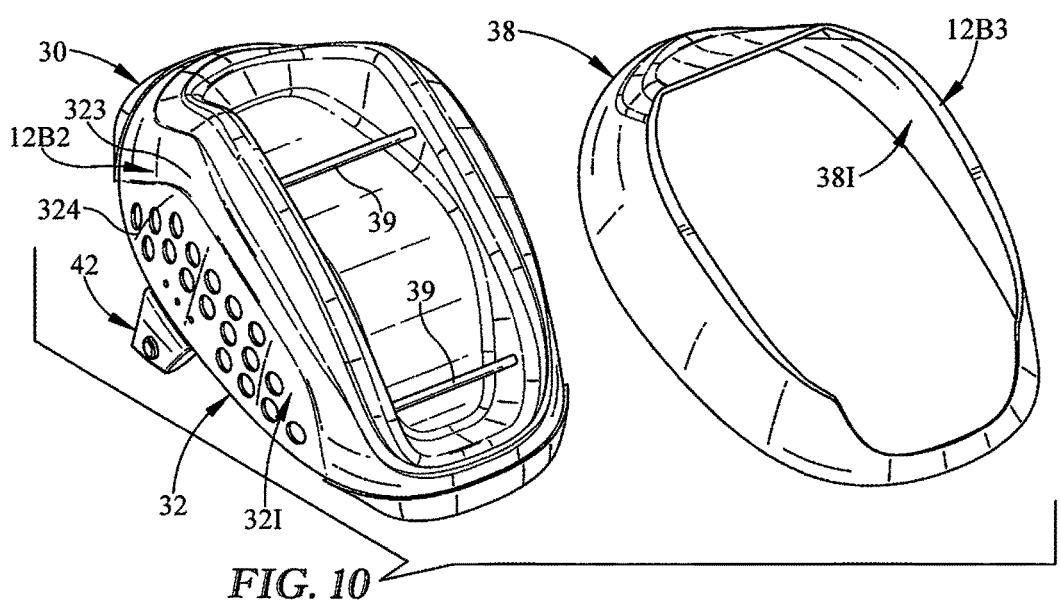
FIG. 10 is another perspective view of the unassembled carrier shell and cummerbund showing the mounting position of each of the two shell-mount rods on the underside of the carrier shell.
Figure 14:
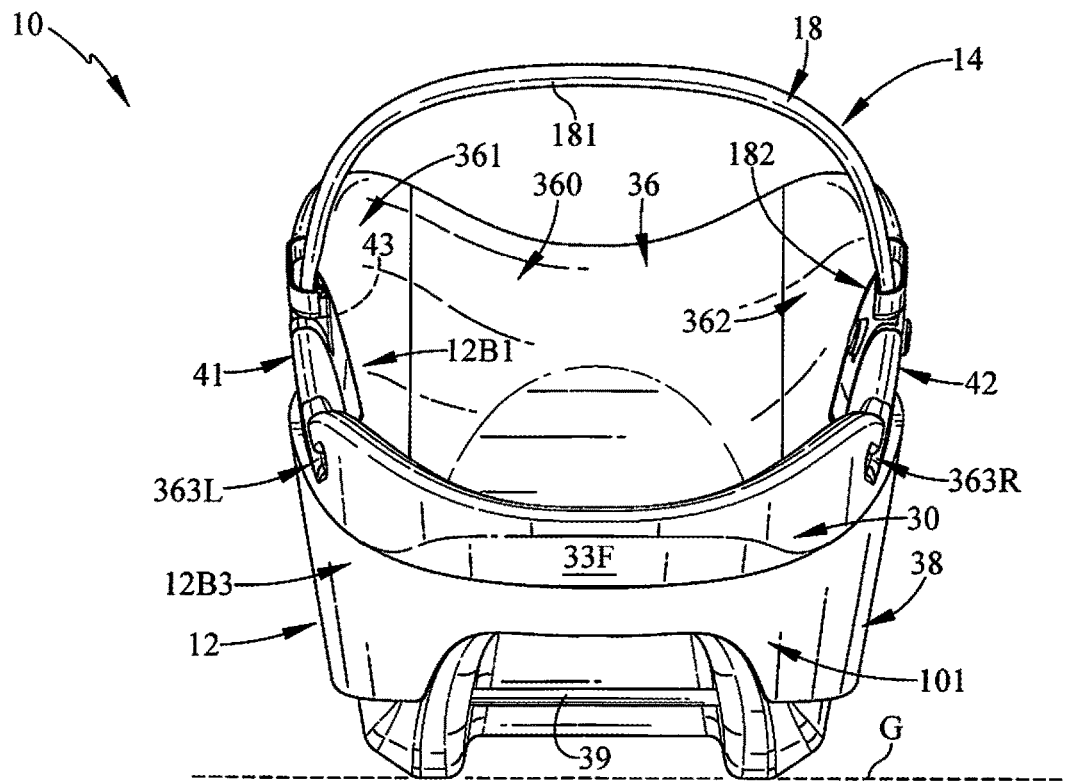
FIG. 14 is a front elevation view of the infant carrier of FIG. 1.
Figure 15:
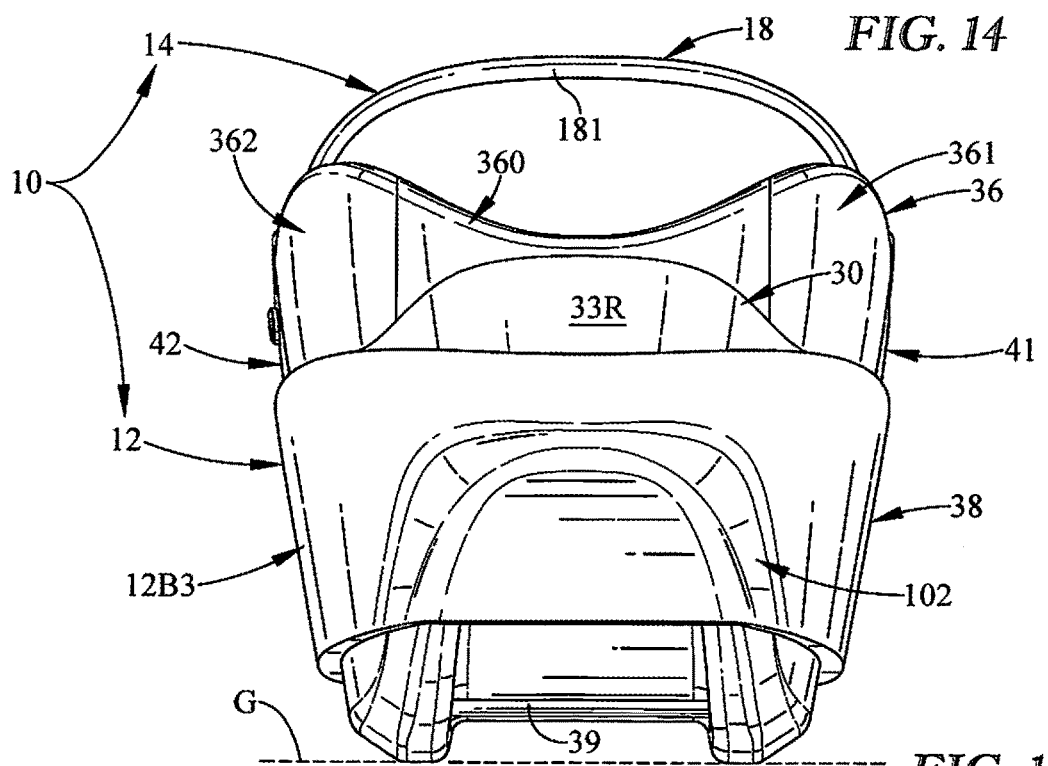
FIG. 15 is a rear elevation view of the infant carrier of FIG. 1.
Figure 16:
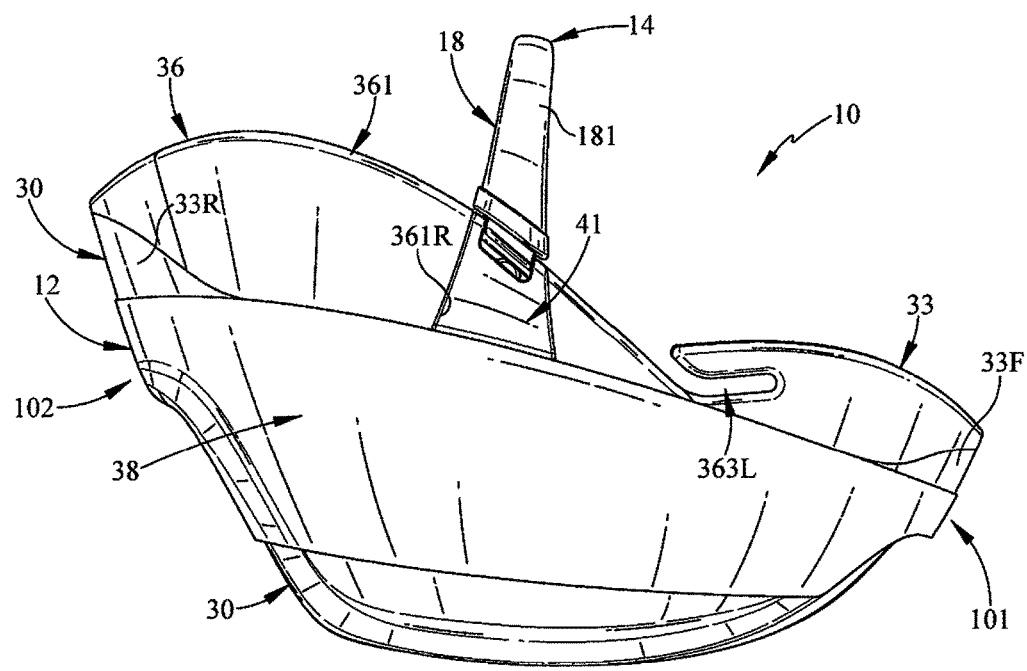
FIG. 16 is a left-side elevation view of the infant carrier of FIG. 1.
Figure 17:
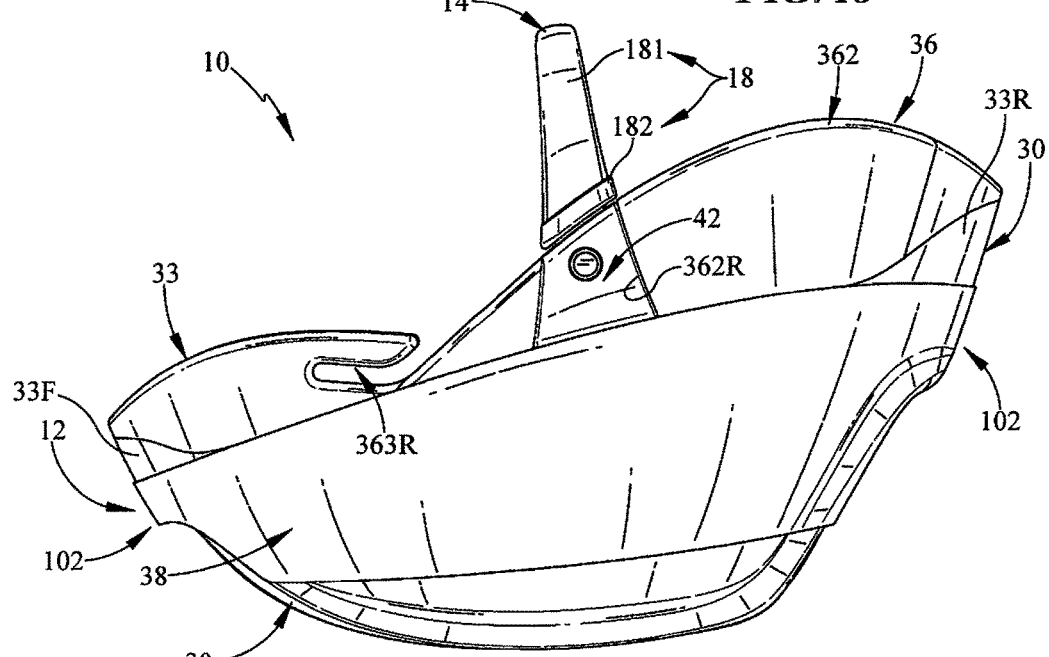
FIG. 17 is a right-side elevation view of the infant carrier of FIG. 1.

Carrier shell 30 includes an infant seat 34 comprising a seat bottom 341 and a seat back 342 and an endless side wall 32 surrounding infant seat 34 as shown, for example, in FIG. 9. Endless side wall 32 defines middle layer 12B2 of the multi-layer side barrier 12B of seat bucket 12. Seat bottoms 3601, 341 of body-support pad 360 and carrier shell 30 are aligned and mated to one another as suggested in FIGS. 5 and 18. Seat backs 3602, 342 of body-support pad 360 and carrier shell 30 are aligned and mated to one another as suggested in FIGS. 5 and 18.

Carrier shell 30 further includes a bottom wall 31 as shown in FIG. 5. Endless side wall 32 extends upwardly from bottom wall 31 and terminates at a top edge 32T as shown in FIG. 8. Infant seat 34 is coupled to bottom wall 31 and arranged to extend upwardly in interior region 30I of carrier shell 30 as shown in FIGS. 8 and 9.

Endless side wall 32 of carrier shell 30 includes a forward portion 32F, a rearward portion 32R, and first and second side portions 32S1, 32S2 arranged to lie in spaced-apart relation to one another to locate infant seat 34 therebetween as shown in FIG. 5. Each side portion 32S1, 32S2 includes a U-shaped solid panel 321 (323) and a perforated panel 322 (324) coupled to an upwardly facing U-shaped edge of the U-shaped solid panel 321 (323) as shown in FIGS. 5-7.

Carry handle 14 is coupled at one end thereof to perforated panel 322 of first side portion 32S1 and at an opposite end thereof to perforated panel 324 of second side portion 32S2 as shown in FIGS. 6 and 7. Cummerbund 38 is arranged on exterior surface of carrier shell 30 to cover perforated panels of 322, 324 first and second side portions 32S1, 32S2 as suggested in FIGS. 5 and 14-17.

Infant seat 34 includes a seat bottom 341 and a seat back 342 arranged to extend upwardly from seat bottom 341 as shown in FIG. 5. Seat bottom 341 is arranged to extend upwardly along the forward portion 32F of endless side wall 32 and terminate in spaced-apart relation to top edge 32T. Seat bottom 341 is arranged to extend upwardly along the rearward portion 32R of endless side wall 32 and terminate in spaced-apart relation to top edge 32T. Infant seat 34 is centered midway between first and second side portions 32S1, 32S2.

Carrier shell 30 includes an endless side wall 32 having an interior surface 32I defining interior region 30I and mating with infant-support nest 36 and an exterior surface 32E facing away from infant-support nest 36 as suggested in FIGS. 5 and 11-13. Cummerbund 38 is an endless strip made of a shock-absorbing cushioning material and formed to include an interior surface 381 that mates with exterior surface of endless side wall 32 of carrier shell 30 as suggested in FIGS. 5 and 9-11. Endless side wall 32 is made of a relatively harder material having a relatively higher durometer than the shock-absorbing cushioning material and carry handle 14 is coupled to endless side wall 32 of carrier shell 30. Endless side wall 32 includes a U-shaped solid panel 321 and a perforated panel 322 coupled to an upwardly facing U-shaped edge of the U-shaped solid panel 321 and cummerbund 38 is arranged to cover perforated panel 322 as suggested in FIGS. 5, 11, and 12.

Infant carrier 10 includes a seat bucket 12 sized to receive an infant and a carry handle 14 coupled to seat bucket 12. Seat bucket 12 includes a floor 12F as shown in FIG. 5 and a multi-layer side barrier 12B arranged to mate with and surround the floor 12F to form an infant-receiving space 16 above the floor 12F as suggested in FIGS. 18 and 18A. The multi-layer side barrier 12B includes an inner layer 12B1 made of a relatively soft shock-absorbing cushioning material, an outer layer 12B3 made of a relatively soft shock-absorbing cushioning material, and a middle layer 12B2 made of a relatively harder yet deformable material having a relatively higher durometer as compared to the inner and outer layers 12B1, 12B3. Carry handle 14 is coupled to the middle layer 12B2 and arranged to extend over the infant-receiving space 16.

Floor 12F of seat bucket 12 is formed to include an infant seat 34 having a seat bottom 341 and a seat back 342 extending upwardly from the seat bottom 341 as shown in FIG. 5. The multi-layer side barrier 12B is arranged to surround infant seat 34 as suggested in FIGS. 5 and 14.

Seat bucket 12 includes a carrier shell 30 providing infant seat 34 and the middle layer 12B12 of the multi-layer side barrier 12B as shown in FIG. 5. Seat bucket 12 also includes an infant-support nest 36 overlying infant seat 34 of carrier shell 30 and providing an infant-receiving space 16 and inner layer 12B1 of the multi-layer side barrier 12B as suggested in FIGS. 5 and 11-13. Seat bucket 12 further includes a cummerbund 38 mating with an endless side wall 32 of carrier shell 30 and providing outer layer 12B3 of the multi-layer side barrier 12B as suggested in FIGS. 5 and 11-13.

The invention claimed is:

1. A child restraint comprising
an infant carrier including a carry handle and a seat bucket sized to receive an infant, the seat bucket including a carrier shell formed to include an interior region, an infant-support nest placed in the interior region of the carrier shell to support an infant transported in the carrier shell and provide interior padding for the carrier shell, and a cummerbund mounted on an exterior surface of the carrier shell to provide exterior padding for the carrier shell, and the carry handle being fixed directly to the carrier shell,
further comprising a carrier-support base and wherein the seat bucket further includes first and second shell-mount rods coupled to the underside of the carrier shell and each shell-mount rod is configured to mate with a companion rod retainer included in the carrier-support base to retain the carrier shell in a stationary position on the carrier-support base.

2. The child restraint of claim 1, wherein portions of the carrier shell, infant-support nest, and cummerbund cooperate to form a multi-layer side barrier around an infant supported in the infant-support nest in the interior region of the carrier shell and wherein the multi-layer side barrier includes an inner layer provided by the infant-support nest and made of a first soft shock-absorbing cushioning material, an outer layer provided by the cummerbund and made of a second soft shock-absorbing cushioning material, and a middle layer made of a harder yet deformable material having a relatively higher durometer as compared to the inner and outer layers.

3. The child restraint of claim 2, wherein the carry handle is coupled to the middle layer and arranged to extend laterally over an infant-receiving space formed in the infant-support nest.

4. The child restraint of claim 3, wherein the carry handle includes a first mount coupled to a first side portion of the carrier shell and arranged to extend upwardly away from a top edge of the first side portion, a second mount coupled to an opposite second side portion of the carrier shell and arranged to extend upwardly away from a top edge of the second side portion and lie in laterally spaced-apart relation to the first mount to locate a portion of the infant-receiving space therebetween, and a seat-bucket lifter coupled to the first mount and adapted to be coupled to the second mount when the carry handle occupies a closed infant-carrying position, and the infant-support nest includes a first side pad that is mated with the first side portion of the carrier shell and is formed to include an upwardly opening first mount receiver configured to receive portions of the first mount therein and includes a second side pad that is mated with the second side portion of the carrier shell and is formed to include an upwardly opening second mount receiver configured to receive portions of the second mount therein.

5. The child restraint of claim 4, wherein the infant-support nest further includes a front pad arranged to mate with a foot end of the carrier shell and mate with forward ends of the first and second side pads and a body-support pad arranged to mate with a head end of the carrier shell and extend between and mate with the first and second side pads.

6. The child restraint of claim 5, wherein the body-support pad includes a seat bottom and a seat back arranged to extend upwardly from the seat bottom toward the head end of the carrier shell.

7. The child restraint of claim 2, wherein the carrier shell includes an infant seat and a side wall surrounding the infant seat and defining the middle layer of the multi-layer side barrier of the seat bucket.

8. The child restraint of claim 7, wherein the carrier shell further includes a bottom wall, the side wall extends upwardly from the bottom wall and terminates at a top edge, the infant seat is coupled to the bottom wall and arranged to extend upwardly in the interior region of the carrier shell.

9. A child restraint comprising
an infant carrier including a carry handle and a seat bucket sized to receive an infant, the seat bucket including a carrier shell formed to include an interior region, an infant-support nest placed in the interior region of the carrier shell to support an infant transported in the carrier shell and provide interior padding for the carrier shell, and a cummerbund mounted on an exterior surface of the carrier shell to provide exterior padding for the carrier shell, and the carry handle being fixed directly to the carrier shell,
wherein portions of the carrier shell, infant-support nest, and cummerbund cooperate to form a multi-layer side barrier around an infant supported in the infant-support nest in the interior region of the carrier shell and wherein the multi-layer side barrier includes an inner layer provided by the infant-support nest and made of a first soft shock-absorbing cushioning material, an outer layer provided by the cummerbund and made of a second soft shock-absorbing cushioning material, and a middle layer made of a harder yet deformable material having a relatively higher durometer as compared to the inner and outer layers,
wherein the carry handle is coupled to the middle layer and arranged to extend laterally over an infant-receiving space formed in the infant-support nest,
wherein the carry handle includes a first mount coupled to a first side portion of the carrier shell and arranged to extend upwardly away from a top edge of the first side portion, a second mount coupled to an opposite second side portion of the carrier shell and arranged to extend upwardly away from a top edge of the second side portion and lie in laterally spaced-apart relation to the first mount to locate a portion of the infant-receiving space therebetween, and a seat-bucket lifter coupled to the first mount and adapted to be coupled to the second mount when the carry handle occupies a closed infant-carrying position, and the infant-support nest includes a first side pad that is mated with the first side portion of the carrier shell and is formed to include an upwardly opening first mount receiver configured to receive portions of the first mount therein and includes a second side pad that is mated with the second side portion of the carrier shell and is formed to include an upwardly opening second mount receiver configured to receive portions of the second mount therein,
wherein the infant-support nest further includes a front pad arranged to mate with a foot end of the carrier shell and mate with forward ends of the first and second side pads and a body-support pad arranged to mate with a head end of the carrier shell and extend between and mate with the first and second side pads,
wherein the body-support pad includes a seat bottom and a seat back arranged to extend upwardly from the seat bottom toward the head end of the carrier shell, and
wherein the carrier shell includes an infant seat comprising a seat bottom and a seat back and a wall surrounding the infant seat and defining the middle layer of the multi-layer side barrier of the seat bucket and the seat bottoms of the body-support pad and the carrier shell are aligned and mated to one another and the seat backs of the body-support pad and the carrier shell are aligned and mated to one another.

10. The child restraint of claim 1, wherein the cummberbund is coupled to the carrier shell in a fixed position relative to the carrier shell.

11. A child restraint comprising
an infant carrier including a carry handle and a seat bucket sized to receive an infant, the seat bucket including a carrier shell formed to include an interior region, an infant-support nest placed in the interior region of the carrier shell to support an infant transported in the carrier shell and provide interior padding for the carrier shell, and a cummerbund mounted on an exterior surface of the carrier shell to provide exterior padding for the carrier shell, and the carry handle being fixed directly to the carrier shell,
wherein portions of the carrier shell, infant-support nest, and cummerbund cooperate to form a multi-layer side barrier around an infant supported in the infant-support nest in the interior region of the carrier shell and wherein the multi-layer side barrier includes an inner layer provided by the infant-support nest and made of a first soft shock-absorbing cushioning material, an outer layer provided by the cummerbund and made of a second soft shock-absorbing cushioning material, and a middle layer made of a harder yet deformable material having a relatively higher durometer as compared to the inner and outer layers,
wherein the carrier shell includes an infant seat and a side wall surrounding the infant seat and defining the middle layer of the multi-layer side barrier of the seat bucket, and
wherein the side wall of the carrier shell includes a forward portion, a rearward portion, and first and second side portions arranged to lie in spaced-apart relation to one another to locate the infant seat therebetween, and each side portion includes a U-shaped solid panel and a perforated panel coupled to an upwardly facing U-shaped edge of the U-shaped solid panel.

12. The child restraint of claim 11, wherein the carry handle is coupled at one end thereof to the perforated panel of the first side portion and at an opposite end thereof to the perforated panel of the second side portion.

13. The child restraint of claim 11, wherein the cummerbund is arranged on the exterior surface of the carrier shell to cover the perforated panels of the first and second side portions.

14. The child restraint of claim 11, wherein the infant seat includes a seat bottom and a seat back arranged to extend upwardly from the seat bottom, the seat bottom is arranged to extend upwardly along the forward portion of the side wall and terminate in spaced-apart relation to the top edge, the seat bottom is arranged to extend upwardly along the rearward portion of the side wall and terminate in spaced-apart relation to the top edge, and the infant seat is centered midway between the first and second side portions.

15. A child restraint comprising an infant carrier including a carry handle and a seat bucket sized to receive an infant, the seat bucket including a carrier shell formed to include an interior region, an infant-support nest placed in the interior region of the carrier shell to support an infant transported in the carrier shell and provide interior padding for the carrier shell, and a cummerbund mounted on an exterior surface of the carrier shell to provide exterior padding for the carrier shell, and the carry handle being fixed directly to the carrier shell, wherein the carrier shell includes a side wall having an interior surface defining the interior region and mating with the infant-support nest and an exterior surface facing away from the infant-support nest and the cummerbund is a strip made of a shock-absorbing cushioning material and formed to include an interior surface that mates with the exterior surface of the side wall of the carrier shell.

16. The child restraint of claim 15, wherein the side wall is made of a relatively harder material having a relatively higher durometer than the shock-absorbing cushioning material and the carry handle is coupled to the side wall of the carrier shell.

17. The child restraint of claim 15, wherein the side wall includes a U-shaped solid panel and a perforated panel coupled to an upwardly facing U-shaped edge of the U-shaped solid panel and the cummerbund is arranged to cover the perforated panel.

18. A child restraint comprising an infant carrier including a carry handle and a seat bucket sized to receive an infant and the carry handle being fixed directly to the seat bucket, wherein the seat bucket includes a floor and a multi-layer side barrier arranged to mate with and surround the floor to form an infant-receiving space above the floor, the multi-layer side barrier including an inner layer made of a relatively soft shock-absorbing cushioning material, an outer layer made of a relatively soft shock-absorbing cushioning material, and a middle layer made of a relatively harder yet deformable material having a relatively higher durometer as compared to the inner and outer layers, and the carry handle is coupled to the middle layer and arranged to extend over the infant-receiving space, wherein the floor of the seat bucket is formed to include an infant seat having a seat bottom and a seat back extending upwardly from the seat bottom and the multi-layer side barrier is arranged to surround the infant seat.

19. The child restraint of claim 18, wherein the seat bucket includes a carrier shell including the infant seat and the middle layer of the multi-layer side barrier and an infant-support nest overlying the infant seat of the carrier shell and providing an infant-receiving space and the inner layer of the multi-layer side barrier.

20. The child restraint of claim 19, wherein the seat bucket further includes a cummerbund mating with a side wall of the carrier shell and providing the outer layer of the multi-layer side barrier.

\* \* \* \* \*